May 8, 1973    R. V. NORTON    3,732,280
PROCESS FOR SEPARATION OF TEREPHTHALONITRILE
Filed Jan. 7, 1972
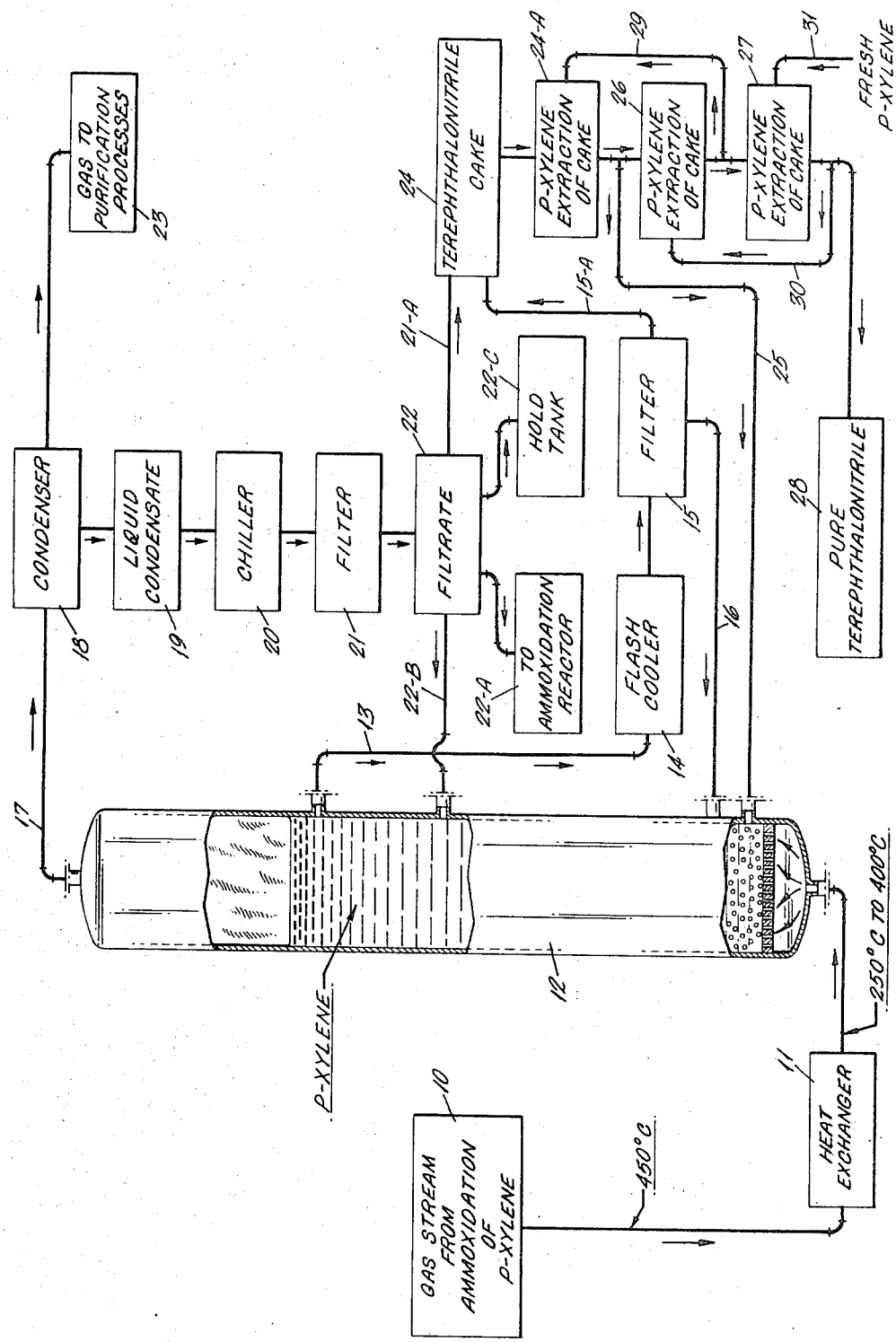

United States Patent Office 3,732,280
Patented May 8, 1973

3,732,280
PROCESS FOR SEPARATION OF TEREPHTHALONITRILE
Richard V. Norton, Wilmington, Del. (% Sun Oil Company, P.O. Box 426, Marcus Hook, Pa. 19061)
Continuation-in-part of abandoned application Ser. No. 89,776, Nov. 16, 1970. This application Jan. 7, 1972, Ser. No. 224,264
Int. Cl. C07c *121/54, 121/58*
U.S. Cl. 260—465 C
2 Claims

ABSTRACT OF THE DISCLOSURE

Process for separation of terephthalonitrile from its admixture with tolunitrile and xylene by the combined steps of (1) adding said mixture to hot xylene, withdrawing a portion of said hot xylene mixture, cooling said withdrawn portion to crystallize terephthalonitrile, filtering off said terephthalonitrile, and returning the filtrate to said hot xylene mixture; (2) removing and condensing vapors from said hot xylene mixture, chilling said condensate, filtering off terephthalonitrile, and combining it with terephthalonitrile obtained in step (1).

---

This application is a continuation-in-part of application Ser. No. 89,776, filed Nov. 16, 1970 and now abandoned.

Vapor phase ammoxidation reaction of p-xylene to produce terephthalonitrile is a well-known process. In such process tolunitrile is a by-product and to obtain terephthalonitrile efficiently, the tolunitrile must be separated and recycled with fresh p-xylene to the ammoxidation reactor.

Prior techniques for separating the tolunitrile involve steam distillation, chloroform washing, xylene washing, or a controlled aqueous evaporation. These methods of purification and/or separation all have inherent disadvantages which limit their overall effectiveness. For example, steam distillation depends upon the vapor pressure difference between tolunitrile and terephthalonitrile for separation to occur and thus, is limited in purification value. The chloroform wash technique only removes surface tolunutrile from crystalline terephthalonitrile leaving much tolunitrile occluded within the terephthalonitrile crystals. In addition, a chloroform recovery and purification operation is required for the tolunitrile recycle. Likewise, when p-xylene washes are used, only surface tolunitrile is removed from terephthalonitrile. In the aqueous flash evaporation procedure, critical temperature control is required and it is, of course, desired to avoid such requirements.

It is accordingly an object of this invention to provide an improved method for separating terephthalonitrile from its admixture with tolunitrile and xylene and this is accomplished by the combination of steps which involves (1) adding said mixture to hot xylene, withdrawing a portion of said hot xylene mixture, cooling the withdrawn portion to crystallize terephthalonitrile, filtering off the crystallized terephthalonitrile, and returning the filtrate to said hot xylene mixture; (2) removing and condensing vapors from the hot xylene mixture, chilling said condensate, filtering off terephthalonitrile and combining it with the terephthalonitrile obtained in step (1). In another embodiment of the invention, the terephthalonitrile obtained by the aforedescribed process is purified by a series of xylene extractions and/or washes at decreasing temperatures whereby a highly pure terephthalonitrile product is obtained.

Reference is made to U.S. Pat. No. 2,450,640 (Denton et al., issued Oct. 5, 1948) and the article by D. J. Hadley appearing in Chemistry and Industry, Feb. 25, 1961, which sets forth the details for ammoxidation reactions.

The product gas stream from such ammoxidations where p-xylene is oxidized to terephthalonitrile comprises p-xylene, terephthalonitrile and tolunitrile and reference is now made to the drawing which will enable this invention to be understood in more detail.

As can be seen from the drawing, the gas stream from the ammoxidation 10 which contains on a weight basis about 10 to 99 percent terephthalonitrile, 1 to 50 percent tolunitrile, 0 to 30 percent p-xylene, 0.1 to 25 percent $CO_2$, 0 to 10 percent $NH_3$, 0 to 40 percent nitrogen, 0 to 5 percent oxygen, and 0 to 5 percent HCN, is at a temperature of about 450° C., and is first passed into a heat exchanger 11 where the temperature is reduced to about 250 to about 400° C. This stream of p-xylene, terephthalonitrile, and tolunitrile is then passed, preferably by sparging, into an agitated vessel 12 containing p-xylene at about 140° C. A portion of the liquid in said vessel 12 is taken through a line 13 to a flash cooler 14 and the cooled liquid, generally at 25 to 100° C., but preferably at about 40 to about 60° C., is filtered (15) and taken through a line 15A to obtain a main body of terephthalonitrile product cake 24. The filtrate 16 from the filter 15 is returned to the vessel 12 containing the p-xylene mixture. Additional terephthalonitrile is recovered from the vapors above the liquid level of the p-xylene mixture. This is accomplished readily by taking said vapors through a line 17 to a condenser 18 to obtain a liquid condensate at about 135° C. (19). The overhead distillate 17 has been found, surprisingly, to comprise an azeotrope of terephthalonitrile and tolunitrile. The liquid condensate is then chilled (20) and filtered (21). Part of the filtrate 22 is returned to the ammoxidation reactor 22–A and part (22–B) is taken to vessel 12. A third part (22–C) is taken to a hold tank 22–C and this material is used as needed either for the first p-xylene extraction of product crystals and/or for p-xylene supply to the ammoxidation reactor. The filter cake of terephthalonitrile 21–A is processed with the main body of terephthalonitrile cake 24 obtained by the above described technique. Gas remaining from the condenser stage 23 is purified by conventional means to recover nitrogen, oxygen, HCN and ammonia, the ammonia being preferably recycled to the ammoxidation reactor.

The terephthalonitrile filter cake 24 obtained as described above is further purified to a pure product by a series of extractions with p-xylene. As shown in the drawing, the first p-xylene extraction of the cake 24–A is conducted at about 60° C. and the filtrate from this extraction technique (25) is recycled to the p-xylene mixture in vessel 12. A second p-xylene extraction of cake 26 at about 40° C. and a third, optional, p-xylene extraction of cake 27 with fresh p-xylene 31 at about 30° C. completes the purification procedure to yield a highly pure terephthalonitrile product (28). The filtrate from the second p-xylene extraction 29 may be returned to the first extraction and the filtrate from the third extraction 30 may be used in the second extraction.

The extraction procedure at reducing temperatures as just described is an important step in that it permits efficient processing of the small amounts of tolunitrile in the filter cakes. Thus, the filtrate from the coldest extraction which contains the least amount of removed impurities is recycled for use at the higher temperature where it serves to remove more tolunitrile. This same technique is applied at the next upstream extraction and in this way an efficient purification system is achieved.

By following the above process of the invention, a very high quality terephthalonitrile product is obtained which is of value for hydrolysis to terephthalic acid which, in turn, is used as a intermediate to a polyethylene terephthalate fibers, film, and other products.

The following examples are given to further illustrate the invention.

EXAMPLE 1

An ammoxidation of p-xylene is carried out in the conventional manner (e.g., such as described in Example 2 of U.S. Pat. No. 3,479,385; Huibers, assigned to The Lummus Company, issued Nov. 18, 1969) and the gas stream of 62.7 parts by weight of p-xylene, 18.6 parts of tolunitrile and 18.7 parts of terephthalonitrile is passed into a heat exchanger to reduce the temperature from about 450° C. to about 300° C. The cooled gas stream is then sparged into a cylindrical vessel of p-xylene in which distillation without reflux is occurring. Fractions of the distillate are taken for analysis by vapor phase chromatography, the results of which are shown in the following table as percent by weight:

TABLE I

| Fraction | Weight percent of— | | | Ratio of TN to TPN |
|---|---|---|---|---|
| | p-Xylene | TN [1] | TPN [2] | |
| 1 | 99.8 | 1.06 | 0.13 | 8.16 |
| 2 | 99.48 | 1.27 | 0.14 | 9.0 |
| 3 | 98.2 | 1.63 | 0.20 | 8.15 |
| 4 | 97.74 | 1.98 | 0.28 | 7.08 |
| 5 | 97.26 | 2.45 | 0.29 | 8.45 |
| 6 | 99.4 | 0.50 | 0.07 | 7.16 |
| 7 | 98.04 | 1.66 | 0.25 | 6.65 |
| 8 | 97.66 | 2.04 | 0.30 | 6.8 |
| 9 | 97.06 | 2.46 | 0.49 | 5.02 |

[1] TN = Tolunitrile.
[2] TPN = Terephthalonitrile.

A portion of the vessel's contents is flash cooled to about 60° C. and filtered to give a product of 75 to 95 percent by weight of terephthalonitrile, the balance being tolunitrile. This cake is then subjected to a purification by xylene extraction as illustrated in the following example.

As can be seen from the above table, the essentially constant ratio of tolunitrile to terephthalonitrile in fractions 1 to 9 indicates the azeotropic nature of this distillate. This azeotrope assures a most efficient separation of tolunitrile from the bulk of the terephthalonitrile remaining in the reaction vessel and also ensures a nearly constant tolunitrile-terephthalonitrile ratio in stream 17. This constant ratio allows for ease and convenience in continuous operation.

EXAMPLE 2

A wet filter cake obtained by filtering a flash cooled (60° C.) portion of the liquid in vessel 12, which filter cake comprises 9.7 parts of a mixture of 95 percent by weight terephthalonitrile, 4 percent tolunitrile, and 1 percent p-xylene is extracted three times at 60° C., 45° C., and 28° C., respectively with p-xylene. After the 45° C. extraction, terephthalonitrile purity of the filter cake is 98.5 percent and after the final wash it reaches 99.5 percent, the amount of tolunitrile present being less than 0.2 percent.

EXAMPLE 3

A typical process carried out in accord with the invention is illustrated in the following table which sets forth feed, temperature and product distribution at each of the various process points identified by the numerical symbols on the drawing:

TABLE II

| Stream number | Parts/ hour | weight percent of— | | | $NH_3$ | Temperature, °C. |
|---|---|---|---|---|---|---|
| | | TPN | TN | p-Xylene | | |
| 10 | 40.0 | 50.0 | 12.5 | 37.5 | + | 450–500 |
| 11 | 40.0 | 50.0 | 12.5 | 37.5 | + | 200–400 |
| 13 | 100.0 | 21.5 | 1.3 | 76.3 | + | 140 |
| 14 | 100.0 | 21.5 | 1.3 | 76.3 | + | 56 |
| 15-A | 22.3 | 97.0 | 3.0 | .1 | + | 50 |
| 16 | 78.0 | 0.1 | 0.8 | 99.0 | + | 30 |
| 17 | 200.0 | 0.2 | 2.3 | 98.0 | + | 140–153 |
| 18 | 200.0 | 0.2 | 2.3 | 98.0 | + | 135 |
| 19 | 200.0 | 0.2 | 2.3 | 98.0 | + | 135 |
| 20 | 200.0 | 0.2 | 2.3 | 98.0 | + | 30 |
| 21-A | 0.5 | 80.0 | 20.0 | 0.0 | + | 30 |
| 22-A | 22.1 | 0.2 | 2.3 | 97.0 | + | |
| 22-C | 100.0 | 0.2 | 2.3 | 97.0 | + | |
| 22-B | 78.0 | 0.2 | 2.3 | 97.0 | + | |
| 23 | | | | | All $NH_3$ | 150 |
| 24 | 22.7 | 96.5 | 3.3 | 1.0 | + | 56 |
| 25 | 104.0 | 0.5 | 0.5 | 99.0 | + | 56 |
| 26 | 20.4 | 98.0 | 2.0 | 0.0 | + | 56 |
| 27 | 20.2 | 99.0 | 1.0 | 0.0 | + | 40 |
| 28 | 20.0 | 99.9 | | | + | 28 |
| 29 | 100.4 | 0.5 | 0.5 | 99.0 | + | 56 |
| 30 | 100.2 | 0.01 | 0.1 | 99.2 | + | 40 |
| 31 | 100.0 | 0.0 | 0.0 | 100.0 | + | 28 |

NOTE.— + = Not accounted for.

As can be seen from the integrated process of the table, terephthalonitrile of very high purity is obtained and this product is well suited for further processing to products such as terephthalic acid, its anhydride and polyester fibers.

The invention claimed is:

1. In the vapor phase ammoxidation of p-xylene to produce terephthalonitrile and where p-toluonitrile is a by-product impurity present in an amount of from 1 to 50 percent by weight, the improvement of separating said terephthalonitrile from its admixture with p-toluonitrile and p-xylene which comprises the combined steps of (1) adding said mixture to a vessel of hot p-xylene at a temperature of about 140° C. where distillation occurs, withdrawing a portion of said hot p-xylene mixture, cooling said withdrawn portion to a temperature of from about 25° C. to about 100° C. to crystallize terephthalonitrile, filtering off said terephthalonitrile, and returning the filtrate to said hot xylene mixture; (2) removing and condensing said distillate vapors from said hot xylene mixture, chilling said condensate, filtering off terephthalonitrile, and combining said terephthalonitrile with terephthalonitrile obtained in step (1) whereby a highly pure terephthalonitrile is obtained.

2. The process of claim 1 where the combined terephthalonitrile from steps (1) and (2) is purified by multiple extractions with p-xylene at temperatures decreasing from about 60° C. to about 40° C.

References Cited

FOREIGN PATENTS

| 796,766 | 6/1958 | Great Britain | 260—465.3 |
| 194,808 | 3/1967 | U.S.S.R. | 260—465 |
| 1,101,389 | 3/1961 | Germany | 260—465 |

JOSEPH P. BRUST, Primary Examiner

U.S. Cl. X.R.

260—465 H